United States Patent [19]
Kurtz et al.

[11] 4,366,500
[45] Dec. 28, 1982

[54] ELECTRONIC COLOR IMAGING APPARATUS HAVING INTEGRAL MULTICOLOR ARRAYS

[75] Inventors: Clark N. Kurtz; Jose M. Mir, both of Rochester; Jerry R. Varner, Fairport, all of N.Y.

[73] Assignee: Eastman Kodak Company, Rochester, N.Y.

[21] Appl. No.: 230,098

[22] Filed: Jan. 29, 1981

[51] Int. Cl.³ .............................................. H04N 1/46
[52] U.S. Cl. ...................................... 358/75; 358/61
[58] Field of Search ...................... 358/60, 61, 75–80, 358/285, 286, 296, 300, 302; 355/4, 5, 18, 32, 37, 38, 67, 70, 71; 350/370, 374, 378, 380, 400; 353/20

[56] References Cited
U.S. PATENT DOCUMENTS

| | | | |
|---|---|---|---|
| 3,428,743 | 2/1969 | Hanlon | 358/61 |
| 3,470,310 | 9/1969 | Shashova | 358/61 |
| 3,930,119 | 12/1975 | Schmidt | 358/285 |
| 4,129,357 | 12/1978 | Frosch | 350/403 |
| 4,229,095 | 10/1980 | Mir | 358/75 |
| 4,294,524 | 10/1981 | Stolov | 358/59 |
| 4,316,196 | 2/1982 | Jacobs | 350/356 |

*Primary Examiner*—Michael A. Masinick
*Attorney, Agent, or Firm*—John D. Husser

[57] ABSTRACT

Electronic imaging apparatus of the kind having a light valve array comprising a plurality of discretely addressable pixel portions which are transformable between light blocking and light passing states in response to activating electric fields features a plurality of color filter elements respectively of different colors and integral with different respective pixel portions of such array.

11 Claims, 9 Drawing Figures

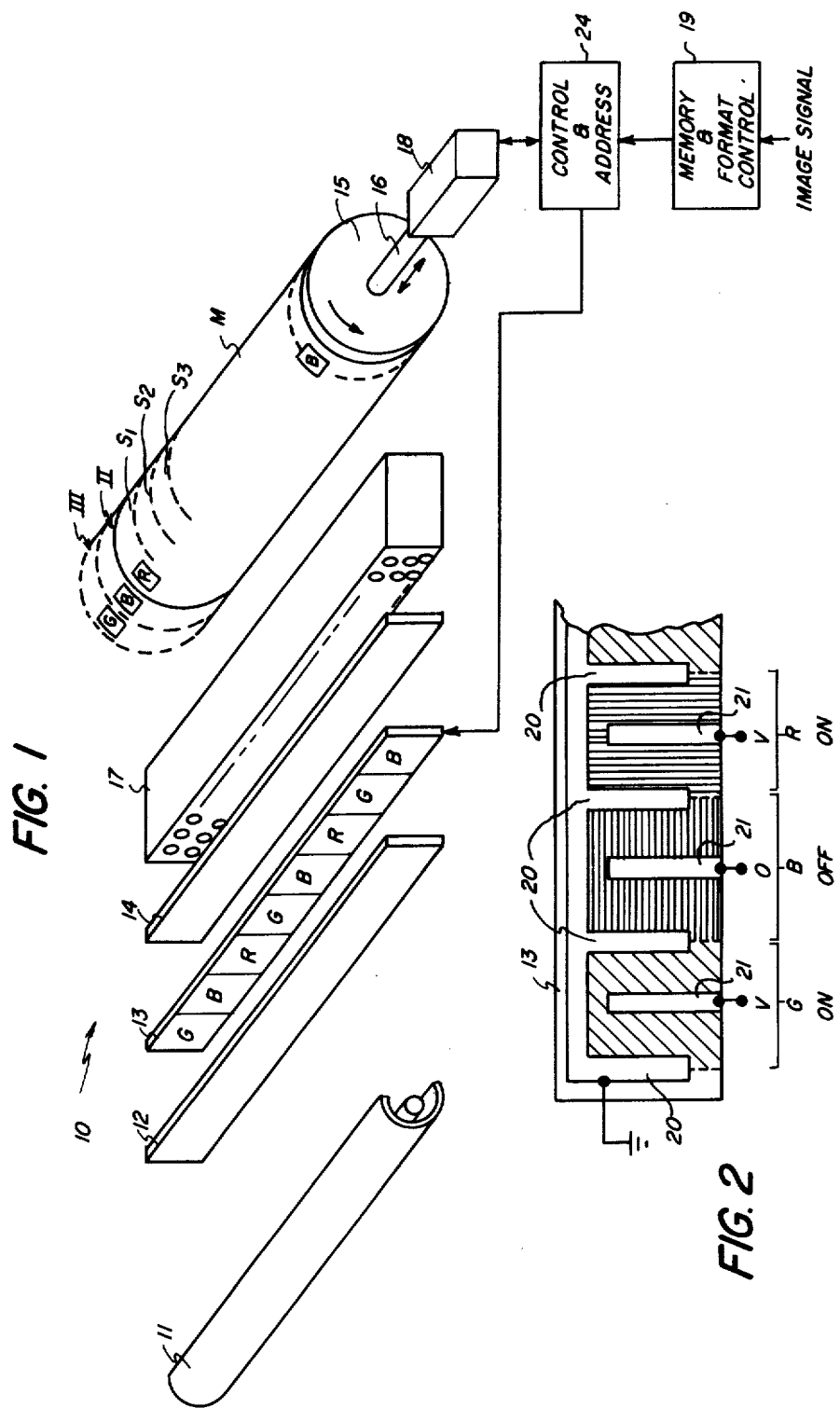

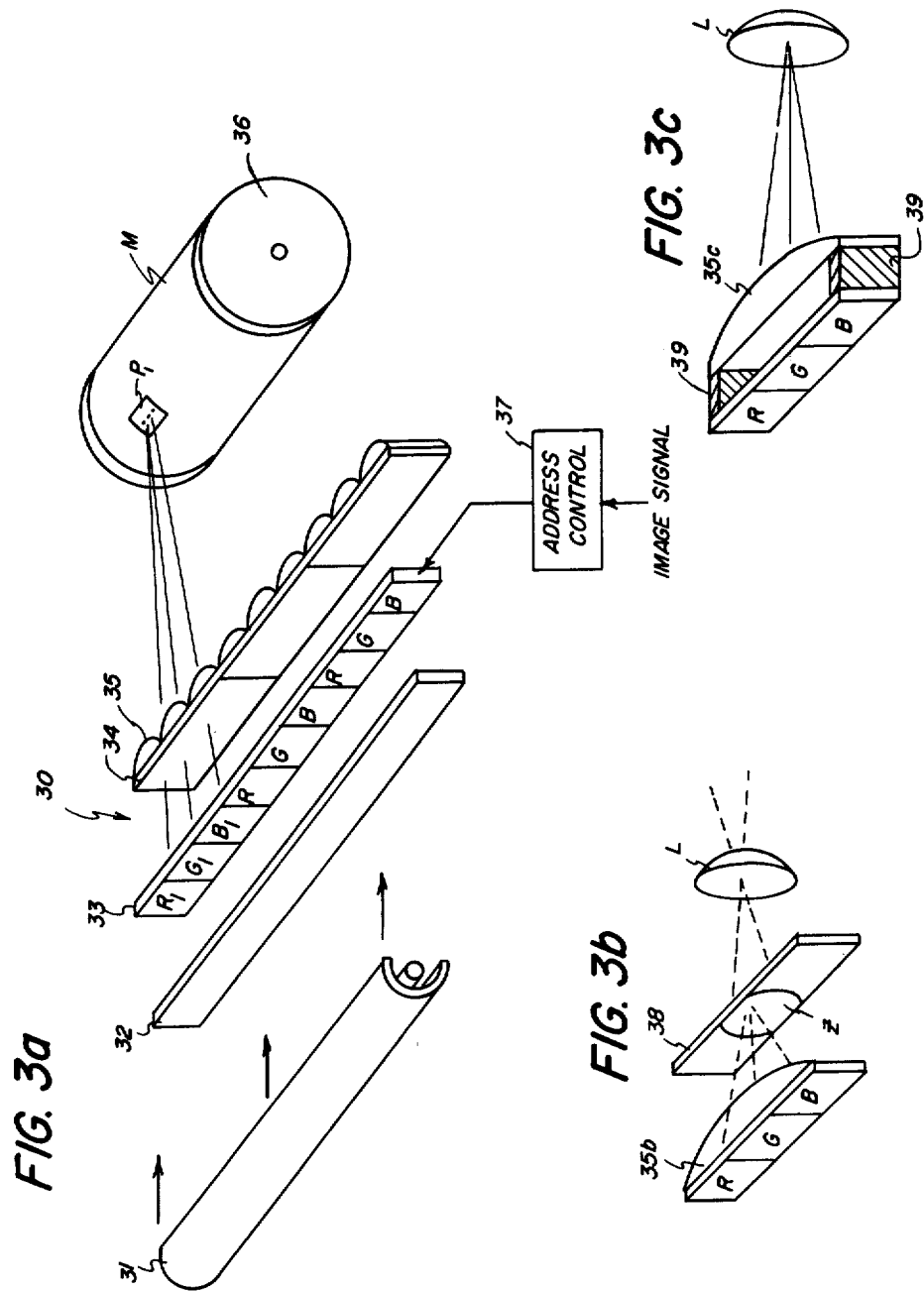

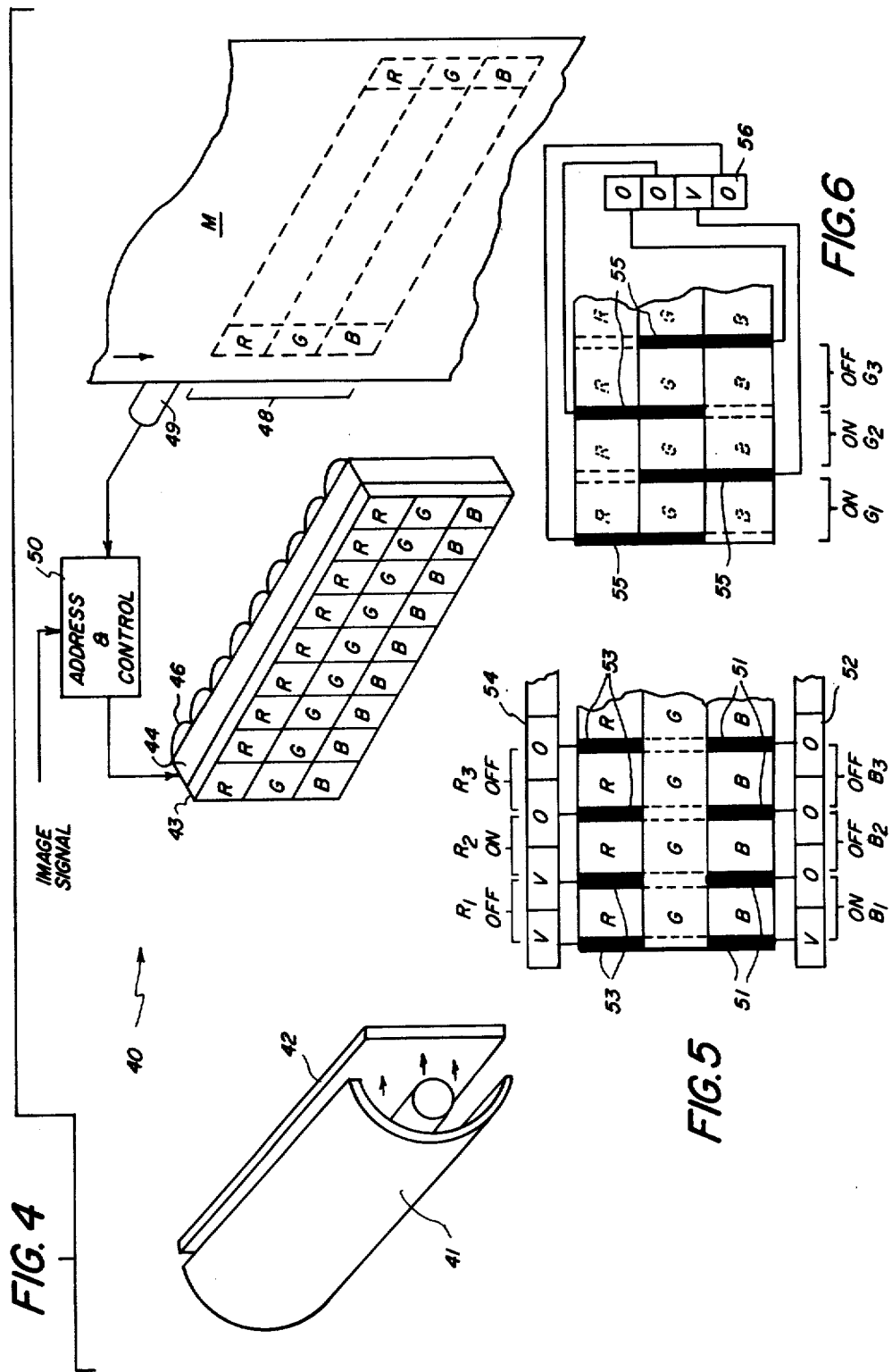

ELECTRONIC COLOR IMAGING APPARATUS HAVING INTEGRAL MULTICOLOR ARRAYS

CROSS-REFERENCE TO RELATED APPLICATIONS

Reference is made herein to U.S. patent application Ser. No. 230,089, entitled "Light Valve Imaging Apparatus Having Improved Optical Configuration," filed Jan. 29, 1981, in the name of J. R. Varner; U.S. patent application Ser. No. 873,441, entitled "Color Devices and Color Filter Arrays Using PhotoBleachable Dyes," filed Jan. 30, 1978, in the name of K. H. Drexhage; U.S. patent application Ser. No. 230,090, entitled "Electronic Imaging Apparatus Having Means for Reducing Inter-Pixel Transmission Nonuniformity," filed Jan. 29, 1981, in the name of J. M. Mir; U.S. patent application Ser. No. 230,099, entitled "Light Valve Imaging Apparatus Having Improved Addressing Electrode Structure," filed Jan. 29, 1981, in the names of J. M. Mir and J. R. Varner; U.S. patent application Ser. No. 230,092, entitled "Improved Light Valve Imaging Apparatus and Method for Providing Gray Scale," filed Jan. 29, 1981, in the name of J. M. Mir and U.S. patent application Ser. No. 230,095, entitled "Light Valve Imaging with Optimized Addressing Potential(s) to Reduce Inter-Pixel Nonuniformity," filed Jan. 29, 1981, in the name of J. M. Mir.

BACKGROUND OF THE INVENTION

1. Field of the Invention

The present invention relates to apparatus for forming a color image (on a recording medium or for viewing) from an electrical signal and more particularly to improvements in electronic color imaging apparatus of the kind using light valve arrays.

2. Brief Description of the Prior Art

U.S. Pat. No. 4,229,095 discloses various embodiments of electronic color-imaging apparatus that utilize arrays of separately-addressable, pixel (picture element) sized, electro-optical means to effect multicolor exposure of panchromatic imaging media. One preferred kind of electro-optical means disclosed in that patent is a light valve comprising a panel of ferro-electric ceramic material, such as lanthanum doped lead zirconate titanate (PLZT) sandwiched between crossed polarizers and activated to operate in a quadratic Kerr cell mode. Thus an array of such light valves comprises a panel of PLZT material with a plurality of interleaved electrodes formed on one major surface in a manner facilitating the selective application of discrete electrical fields transversely across (in a direction perpendicular to the direction of viewing) discrete surface areas of the plate. Upon application of such fields, the PLZT material becomes birefringent and rotates the direction of polarization of incident light by an extent dependent on the field magnitude. This results in the transmission of light through the PLZT panel and polarizers varying as a function of the electric fields. A color image is formed electronically by selectively opening and closing of such light valves in synchronization with pulses of red, green and blue light and according to the red, green and blue color information for the pixels of that image.

The above-mentioned patent discloses two preferred approaches for providing such successive pulses of different color light. In one approach separate radiation sources, such as separate elongated flash lamps with respective red, green and blue filters, are energized successively by a controllable power source. In the other approach a rotating member, having successive red, green and blue filter sectors is interposed between a single illumination source and the light valve array.

The above approaches are completely suitable for many electronic imaging applications; however, in certain electronic imaging applications they each have some undesirable features. The multiple-lamp approach involves three, instead of one, illuminating sources and thus some additional costs. Moreover, there are certain limits as to how fast these sources can be turned on and off and for higher speed imaging applications, this can present a problem. The rotating filter approach avoids both of the aforementioned potential difficulties; however, it involves precise synchronization of the filters' movement and thus involves the cost of precise servo-systems, as well as potential operational difficulties in higher speed applications.

Alternative approaches for providing multicolor exposures in accordance with the teachings of that patent are to provide three separate imaging stations, spaced along the path of movement of the photosensitive medium or to provide for at least three imaging passes of the photosensitive medium relative to a single imaging station.

In the multiple-spaced-station approach, each different station is provided with a linear array uniformly illuminated with a different color of light (e.g., red, green or blue) and the different arrays are each addressed to an on-off condition according to the line-color pertaining to the line of the photosensitive medium currently aligned therewith. For example, if the blue color array is furthest downstream it will be addressed with line-one information while the furthest upstream red color array is addressed with line-three information, having already exposed lines one and two with red light. Although useful, this approach has disadvantages because it is difficult to place and maintain the separate arrays in proper relative alignment with respect to the imaging path. Thus, the light valve pixels are minute in size, e.g. 200/linear inch, and without great care, the pixels will be in improper transverse alignment (e.g., pixels 3, 4, 5 of the red array aligned with pixels 4, 5, 6 of the green array and 2, 3, 4 of the blue array). It will be appreciated that when such misaligned arrays are addressed by the control electronics a given pixel, e.g. 4 of the image medium, could receive the red exposure for pixel 4 but the green exposure for pixel 5 and the blue exposure for pixel 3. The same problem exists if separate arrays are used for multiple-pass color separation exposures and if a single array is used it is necessary to change color filters or light sources.

SUMMARY OF THE INVENTION

It is one purpose of the present invention to provide a color electronic imaging approach which avoids the various disadvantages discussed above. Thus in one significant aspect the present invention provides a light valve array, adapted for electronic color imaging without the need for separate, pulsed light sources or synchronized moving filters, which can be readily aligned in imaging apparatus and which avoids problems of misregistration of corresponding pixel elements of the different colors.

Such advantages are achieved in accordance with one preferred embodiment of the present invention by providing for such electronic imaging apparatus an improved electro-optic modulator having (1) a panel of electro-optic material of the type transformable from an isotropic to birefringent state by application of an electric field, (2) addressable electrode means disposed on such panel in a regular pattern to form a plurality of separately-activatable pixel portions and (3) a plurality of filter means respectively of different colors and coupled to different individual pixel portions of such panel.

The present invention contemplates various structural implementations of such integral multicolor light valve including embodiments wherein a row of pixel portions has different color filter means respectively associated with different pixel portions, embodiments wherein a plurality of rows each of a different color are included in an integral structure and integral multicolor light valve arrays wherein the different color filter means are associated with different pixel portions respectively in other regular patterns.

BRIEF DESCRIPTION OF THE DRAWINGS

In the detailed description of the preferred embodiments of the invention presented below, reference is made to the accompanying drawings, in which:

FIG. 1 is a schematic perspective view of one embodiment of integral, multicolor, light valve apparatus in accordance with the present invention, utilizing a single-row array and multiple passes of the imaging medium;

FIG. 2 is an enlarged plan view of a portion of the FIG. 1 light valve array;

FIGS. 3A-3C are schematic perspective views of other embodiment of integral, multicolor light valve apparatus in accordance with the present invention, utilizing a single-row array and optical merging of different color pixels during a single pass of the imaging medium;

FIG. 4 is a schematic perspective view of another embodiment of integral, multicolor light valve apparatus according to the present invention, utilizing a multi-row array and time-delay merging of different color pixels during a single pass of the imaging medium;

FIGS. 5 and 6 are respectively enlarged front and rear plan views of a portion of the FIG. 4 light valve array.

DETAILED DESCRIPTION OF THE PREFERRED EMBODIMENTS

Figure 7:
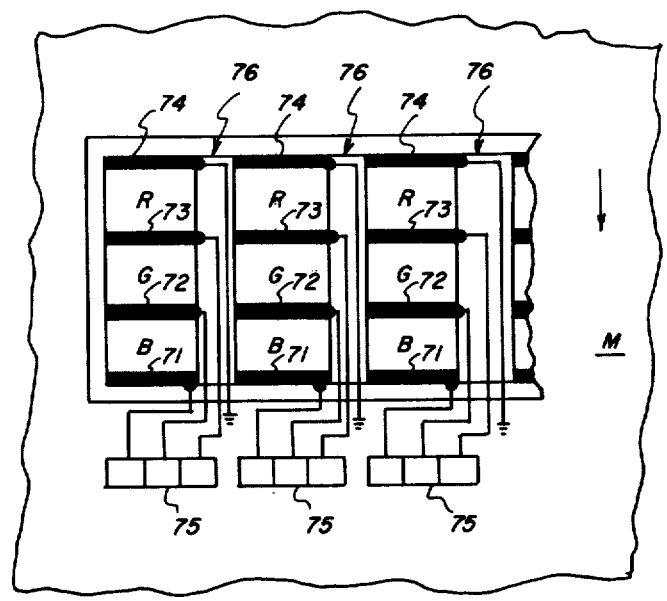
FIG. 7 is an enlarged plan view of another embodiment of multi-row light valve array useful, e.g. in the apparatus shown in FIG. 4.

The FIG. 1 embodiment of electronic color imaging apparatus 10 comprises a source of panchromatic illumination 11 which directs light through an entrance polarizer 12 uniformly across the surface of electro-optic modulator panel 13 which can be formed e.g. of materials such as disclosed in U.S. Pat. No. 4,229,095, one specifically preferred material being 9/65/35 PLZT. Light passing through modulator 13 intersects exit polarizer 14 which is crossed with respect to polarizer 12, and light passing polarizer 14 is imaged by lens means 17 on photosensitive medium M carried by a transport drum 15. In the illustrated embodiment lens means 17 is a self-focusing lens array which can comprise, e.g. a linear array of gradient index fiber optic bundles such as described in *Applied Optics*, Vol. 19, No. 7, April 1980, pp. 1065-1069. Conventional projection optics are also highly useful. It is desirable that the light illuminating the polarizing means and modulator be collimated and substantially normal to the ingress surface of the modulator and U.S. patent application Ser. No. 230,089, entitled "Light Valve Imaging Apparatus Having Improved Optical Configuration," filed Jan. 29, 1981, in the name of J. R. Varner discloses one preferred technique for accomplishing this result and is incorporated herein by reference.

The transport drum 15 is rotated as indicated by shaft 16 and is precisely indexable along shaft 16 selectively between the solid line position and the dotted line positions II and III shown in FIG. 1 by index control mechanism 18. It will be appreciated that the polarizers and electro-optic modulator can be formed as a sandwich, rather than spaced along the optical path and that in certain applications, wherein the modulator is addressed in its longitudinal, scattering mode, the polarizers would not be required.

Referring now to FIG. 2 as well as FIG. 1, one preferred embodiment of electro-optic modulator, in accordance with the present invention, can be described in more detail. As shown in FIG. 2, the modulator 13 has on its surface a grounded reference electrode 20 and a plurality of signal electrodes 21 which extend in regular spaced relation between adjacent branches of reference electrode 20. Various alternative electrode configurations can be utilized, see e.g. U.S. patent application Ser. No. 230,099, entitled "Light Valve Imaging Apparatus Having Improved Addressing Electrode Structure", filed Jan. 29, 1981, in the names of J. M. Mir and J. R. Varner. The general function desired is the selective addressability of individual pixels of the modulator by application of an electric field thereacross. In the FIG. 2 electrode configuration such activating fields can be implemented by selectively applying a voltage to signal electrodes, e.g. by a serial-in, parallel out shift register, not shown. Specific examples of several preferred addressing structures and modes are disclosed in U.S. patent application Ser. No. 230,092, entitled "Improved Light Valve Imaging Apparatus and Method for Providing Gray Scale," filed Jan. 29, 1981, in the name of J. M. Mir, which is incorporated herein by reference. Preferred voltage levels for creating such activating fields are disclosed in U.S. patent application Ser. No. 230,095, entitled "Light Valve Imaging With Optimized Addressing Potential(s) to Reduce Inter-Pixel Nonuniformity," filed Jan. 29, 1981, in the name of J. M. Mir.

Referring to FIGS. 1 and 2, it will be noted that in the row of pixels of the light valve array individual pixels alternate between the designations R, G, B. Such designations indicate that an R pixel of the modulator has a red color filter integrally associated therewith, a G pixel has a green color filter integrally associated therewith and a B pixel has a blue color filter integrally associated therewith.

Such integral color pixel filters can be formed by various techniques. For example, U.S. Pat. Nos. 4,081,277; 4,190,446 and 4,196,010 disclose techniques for fabricating color filters using heat transferable dyes. U.S. Pat. No. 4,204,866 discloses a technique for forming such filters using mordanted dyes. U.S. Pat. Nos. 3,019,124 and 3,032,008 disclose other suitable color filter fabricating techniques. Another preferred technique for forming color filters is disclosed in U.S. patent application Ser. No. 873,441, entitled "Color Imaging Devices and Color Filter Arrays Using PhotoBleachable Dyes," filed Jan. 30, 1978, in the name of K. H. Drexhage. This last mentioned technique is particularly suitable for correction for inter-pixel transmission variations as disclosed in U.S. patent application Ser. No. 230,090, entitled "Electronic Imaging Apparatus Having Means for Reducing Inter-Pixel Transmission Nonuniformity," filed Jan. 29, 1981, in the name of J. M. Mir.

Regardless of how formed, the purpose of the filters is to function in the usual mode, i.e. absorbing light of the colors other than the designated color, i.e. R passing only red light, G passing only green light and B passing only blue light.

One mode of operation of the FIG. 1 embodiment of the invention can now be explained. In the first pass of this multi-pass mode (i.e. the first complete scanning of an image section of the recording medium with respect to the light controlled by the light valve array), the transport drum 15 revolves about its longitudinal axis in a first transverse position "I", the solid line position shown in FIG. 1. During this first pass, the R, G, B pixels of the modulator are addressed in accordance with off-on information in accordance with the red, green and blue content of corresponding longitudinal strips of the image to be reproduced. That is, as the recording medium is moved past the exposure zone where the light path from the array traverses it, successive portions of longitudinal (i.e. extending in the direction of recording medium movement) strips thereof are respectively subject to illumination with red, green or blue light, depending on whether their aligned modulator pixel is activated during movement of such portion therepast.

Activation of the modulator portions is selectively effected by control and address means 24, including e.g. a serial-in parallel-out shift register which receives appropriate signal information for successive lines of the image in synchronization with movement of the transport drum. One skilled in the art will appreciate that the signal information applied to the modulator must have a proper format for each pass of the image medium. Thus in the first pass of the medium, the red pixel aligned with strip $S_1$ of the recording medium must receive the appropriate red color content information for pixels of that strip, the green pixel aligned with strip $S_2$ must receive information for the pixels of that strip and the blue pixel aligned with strip $S_3$ must receive information for the pixels of that strip. Similarly, the pixels aligned with other strips must receive appropriate red, green or blue information for its aligned strip.

This can be accomplished either by the proper selection of the mode in which the electrical color information signal for the image is formed or by using appropriate formatting signal processing and storage logic circuitry, designated generally 19 in FIG. 1. Thus if the electric signal of the image to be reproduced is formed by scanning of an original or by selective addressing of a two dimension color sensor array, the signal can be formatted directly. For example, the scannings of the original could be with a linear CCD array having corresponding color filter patterns.

If the electrical signal is in a conventional TV format, signal processing and storage logic such as designated by 19 of FIG. 1 can be provided to separate and store the color information for respective longitudinal strips of the image in the appropriate format for output at appropriate stages during the appropriate one of the multi-passes of the recording medium. A wide variety of circuits and programs for reformatting such signal in many different forms are well known and will not be described herein as being well within the purview of one skilled in such arts.

After the first pass of the recording medium, the transport drum is indexed to the second pass position designated by dotted line position II in FIG. 1. In the second pass position, it can be seen that strip $S_1$ is now aligned with a blue pixel (not active during the first pass), strip $S_2$ is now aligned with the red pixel (previously aligned with strip $S_1$ in the first pass) and strip $S_3$ is aligned with a green pixel (previously aligned with strip $S_2$ during the first pass). Other strips are similarly now aligned with a different color pixel than in the first pass. During the second passage of the recording medium, the pixels are addressed for activation respectively in accordance with the proper color content information for the particular strip now aligned therewith. After completion of the second pass the transport drum is moved to its third pass position, indicated by dotted line position III in FIG. 1 and it will be seen that each strip of the recording medium is now aligned with a third different color. Thus during the third pass with appropriate activations of the pixels, each strip has been subject to red, green and blue light exposures modulated in accordance with the signal information for the image to be reproduced.

It will be appreciated that various modifications of the above-described integral color filter array, multiple pass approach are possible. For example, in many applications it is preferred that the modulator array be indexed between passes rather than the transport drum. Also, more than three passes could be provided, with some strips not receiving exposure during some passes. However, in any of these modes, advantages of the present invention pertain. Thus, the relative position of the red, green and blue pixel elements are fixed by their integral nature.

FIG. 3A discloses a different electronic color imaging apparatus embodiment 30 of the present invention. As in the FIG. 1 embodiment, a source 31 directs panchromatic light through entrance polarizer 32 to uniformly illuminate the surface of modulator 33. Modulator 33 can be formed in the same manner described above but differs from the FIG. 1 embodiment in that groups of three discrete, separately-addressable modulator portions define pixels for the image to be reproduced. Thus the first group of R, G, B modulator portions from the means for multi-color exposing of the successive pixel strip $S_1$ of image medium M as it is scanned past the array by rotation of transport drum 36. As in the FIG. 1 embodiment, light passing the modulator intersects exit polarizer 34 which is crossed relative to polarizer 32; however in this embodiment, lens means 35 are provided between the exit polarizer 34 and the recording medium to optically merge the light from respective R, G, B groups of modulator portions onto a common pixel portion of the recording medium carried on drum 36.

One mode of operation of the integral color filter embodiment shown in FIG. 3A can now be explained. Thus as successive transverse lines of the recording medium are moved sequentially past the light valve array, the modulator portions of the different R, G, B pixel groups of the modulator 33 are selectively addressed by address control 37 in accordance with the appropriate color information for the lines. Thus as a given line passes the exposure station, the first R, G, B pixel group will have its respective red, green and blue portions activated or not in accordance with the appropriate colors to be exposed on the pixel aligned therewith. Other pixel groups will be similarly addressed so that a complete color image exposure can be effected in a single pass.

In the optical merging mode shown in FIG. 3A, each R, G, B pixel portion has a lenslet which directs light at a slightly defocused condition toward a given pixel zone of the imaging zone (e.g. as $R_1$, $G_1$, $B_1$ direct light to zone $P_1$ in FIG. 3A). This approach is acceptable for applications where high resolution is not required; however, FIGS. 3B and 3C illustrate more preferred optical merging techniques. In the FIG. 3B embodiment, each R, G, B group of modulator pixels has a common lenslet 35b which focuses the modulator portions at a common intermediate zone Z where a diffuser plate 38 is located. Projection optics L then image the diffuser plate at the imaging medium. In the FIG. 3C embodiment, each given R, G, B group of modulator pixels likewise has a common lenticule 35c; however, in this instance spaced from the surface of the modulator and separated from adjacent pixel groups by light baffle means 39. In this embodiment each lenticule receives scattered light from the R, G, B pixels of its modulator group and the projection optics L images the lenticule 35c at the exposure plane for recording medium M. Other variations of this integral color filter, optical merging approach will occur to those skilled in the art and the advantages of having the relative position of the different color elements fixed with pertain.

Referring now to FIG. 4, another different embodiment of the present invention is shown. The electronic color imaging apparatus 40 comprises a source 41 of panchromatic light adapted to uniformly illuminate modulator 43 through entrance polarizer 42. In this embodiment, modulator 43 comprises a plurality of rows of discrete, separately-addressable pixels. As indicated, the pixels of the first, second and third rows respectively have red, green and blue filters associated therewith. These filters can be formed in the same manner as described above; however, it will be noted in FIG. 4 that the rows of pixels are each aligned with a different transverse line of recording medium at the exposure station 48. Thus the red, green and blue light exposures of the recording medium occur at longitudinally spaced locations; however, it is to be noted that the various different color rows are formed on an integral modulator panel.

Referring briefly to FIGS. 5 and 6, one electrode structure for defining a pixel pattern of the kind indicated in FIG. 4 on an integral modulator panel is illustrated. FIG. 5 shows one face of such a modulator panel and FIG. 6 shows the opposite face. It can be seen that regularly spaced electrodes 51 extend from between pixels of the blue row of the modulator to addressing means 52 e.g. a serial in-parallel out shift register along the bottom edge thereof. Similarly, regularly spaced electrodes 53 extend between pixels of the red row of the modulator to a similar addressing means 54 along the top edge of the modulator. Referring to FIG. 6, it can be seen that electrodes 55 extend between the pixels of the green rows at the same regular interval as electrodes 51 and 53; however, electrodes 55 are on the opposite surface from electrodes 51 and 53. Also, it can be seen that electrodes 55 alternately extend to the top and bottom edge of the modulator. This is preferred in order to avoid creating a significant electric field across the red or blue pixel rows. That is the gap spacing between electrodes 55 that traverse the red and blue pixel regions is at least twice that of the gap between activating electrodes 51 and 53 and does not have a sufficient electro-optic effect to cause undesired modulation by the red or blue pixel rows in response to green row activation. The electrodes 55 cam be coupled to a similar addressing means 56 as shown.

To effect selective activation of the pixels of any row can be addressed by the image signal information, preferably input to their shift registers through logic circuitry such as an "exclusive-or" gate to create a field or no-field condition across the appropriate pixels. Appropriate electrode addressing for exemplary OFF-ON conditions is indicated in the Figures by V (potential applied) and O (no potential applied) designations.

Referring again to FIG. 4, one mode of operation of the embodiment there shown can be explained. Thus as the image medium M is moved past the exposure station 48 by drive means 49, the addressing and control means 50 such as described with respect to FIGS. 5 and 6 selectively activates pixels of the integral multi-row modulator. Light passing activated pixels will pass crossed exit polarizer 44 and be directed by lens means 46 to expose aligned portions of the recording medium at the exposure station. Light passing non-activated pixel portions will not pass polarizer 44. It will be appreciated that the addressing signals to the red, green and blue pixel rows at any given time will be for different lines of the color image to be reproduced. Thus, the information addressed to the red pixel row during a given line exposure period will be for a line upstream, in the direction of movement of the recording medium, from that addressed to the green pixel row—which in turn will be addressed for a line upstream from that of the blue pixel row. As mentioned with respect to the FIG. 1 embodiment, appropriate signal delays can be provided directly by the mode of image signal formation or by appropriate signal reformatting processing.

Referring now to FIG. 7 an alternative addressing electrode configuration adapted for a multi-row array such as described with respect to FIG. 4 is shown. This electrode configuration is advantageous from the fabrication viewpoint of having all electrodes on the same surface. In this configuration aligned columns of R, G, B pixels of the multi-row array are addressed by three-bit shift registers. Thus electrodes 71, 72, 73 and 74 are spaced at regular intervals in columns generally orthogonal to the filter rows and define sequential red, green and blue pixel portions for exposing a pixel area of the recording medium moving therepast in the columnar direction. Electrodes 71, 72 and 73 are coupled to shift register 75 and electrode 74 is coupled to ground. By applying appropriate energizing signals to the shift registers for each column of pixels, e.g. via exclusive or logic, the appropriate red, green and blue exposures can be selectively controlled. Again, it will be noted that the red, green and blue pixels of each column will be addressed according to a different line of color information during any given exposure period. Appropriate inter-column spacings 76 are provided for the electrodes to connect their respective activating means and it is desirable that these spacings be made opaque. The inter-column gap that would be created on the recording by these spacings can be eliminated by optical means between the exit polarizer and the exposure station, e.g.

by slightly defocusing the image of the modulator at the exposure plane of the recording medium.

It will be appreciated that various other color filter patterns can be utilized, e.g. in accord with that used in known electronic color sensor arrays to provide emphasis of luminance information (i.e. providing a preponderance of given color filter elements). Also, in certain embodiments wherein polarizing means are integrally coupled to the modulator, it may be feasible to form the color filter means on the polarizing means, thus coupling them to the modulator panel. Likewise, in certain forms of modulator panel the color filter means may be formed within the panel.

The invention has been described in detail with particular reference to certain preferred embodiments thereof, but it will be understood that variations and modifications can be effected within the spirit and scope of the invention.

What is claimed is:

1. For use in electronic color imaging apparatus of the type having a multicolor light source directed toward an imaging station in which color photosensitive imaging medium is disposed, an improved electro-optic modulator comprising:
    (a) a panel of electro-optic material of the type transformable from an isotropic state to a birefringent state in response to application of an electric field;
    (b) addressable electrode means disposed on said panel in a regular pattern defining a plurality of separately-activatable pixel portions within said panel; and
    (c) a plurality of filter means respectively of different colors and coupled to different individual pixel portions of said panel.

2. The invention defined in claim 1 wherein: (1) said panel is formed as a strip adapted to extend at least partially across such an imaging station, (2) said electrode means define a row of discrete pixel portions along said panel and (3) said filter means alternate in color along said row.

3. The invention defined in claim 1 wherein: (1) said panel is formed as a multi-row strip adapted to extend at least partially across such an imaging station, (2) said electrode means define a plurality of rows of discrete pixel portions along said panel with corresponding pixels of each of the different rows aligned in columns generally orthogonal to the rows and (3) the pixels of each row each have color filter means of the same color aligned therewith.

4. For use in electronic color imaging apparatus of the type having a multicolor light source directed toward an imaging zone, an improved electro-optic modulator comprising:
    (a) a light valve array, including a panel of electro-optic material, transformable between light blocking and a light passing states in response to application of an electric field;
    (b) addressable electrode means disposed on said panel in a regular pattern defining a plurality of separately-activatable pixel portions of said array; and
    (c) a plurality of filter means respectively of different colors and integral with different respective pixel portions of said array.

5. In electronic color apparatus of the type having an exposure station and a multicolor light source directed toward said exposure station, an improved light valve device for controlling passage of light from said source to color photosensitive medium located at said exposure station in accordance with an electrical signal containing information of a color image to be reproduced, said device comprising:
    (a) an electro-optic modulator including: (1) a panel of electro-optic material of the type transformable from an isotropic state to a birefringent state in response to application of an electric field, (2) addressable electrode means disposed on said panel in a regular pattern defining a plurality of separately-activatable pixel portions within said panel and (3) a plurality of filter means respectively of different colors and coupled to different individual pixel portions of said panel; and
    (b) means for addressing said electrode means in accordance with such electrical signal.

6. The invention defined in claim 5 wherein: (1) said panel is formed as a strip adapted to extend at least partially across such an imaging station, (2) said electrode means define a row of discrete pixel portions along said panel and (3) said filter means alternate in color along said row and further comprising means for providing relative movement between such imaging medium and said modulator.

7. The invention defined in claim 6 further comprising means for imaging groups of pixels having different color filter means on such imaging medium in a slightly defocused condition so as to optically merge the pixels of such groups to form a multicolor pixel exposure of such medium.

8. The invention defined in claim 6 further including means for providing a plurality of scanning passes between said modulator and such color photosensitive medium and means for transversely indexing one of said modulator and such medium between such passes.

9. The invention defined in claim 5 wherein: (1) said panel is formed as a multi-row strip adapted to extend at least partially across such an imaging station, (2) said electrode means define a plurality of rows of discrete pixel portions along said panel with corresponding pixels of each of the different rows aligned in columns generally orthogonal to the rows and (3) the pixels of each row each have color filter means of the same color aligned therewith and further comprising means for providing relative movement between such imaging medium and said modulator.

10. The invention defined in claim 9 wherein said addressing means addresses separate color information to each of said rows.

11. In electronic color apparatus of the type having an imaging station and a multicolor light source directed toward said imaging station, an improved light valve device controlling passage of light from said source to said imaging station in accordance with an electrical image, said device comprising:
    (a) an electro-optic modulator including: (1) a light valve array comprising a panel of electro-optic material and transformable between light blocking and light passing states in response to application of an electric field, (2) addressable electrode means disposed on said panel in a regular pattern defining a plurality of separately-activatable pixel portions of said array and (3) a plurality of filter means respectively of different colors and coupled to different respective pixel portions of said array; and
    (b) means for addressing said electrode means in accordance with such electrical signal.

* * * * *